United States Patent
Kim et al.

(10) Patent No.: US 7,620,399 B2
(45) Date of Patent: Nov. 17, 2009

(54) METHOD AND SYSTEM FOR PERFORMING HANDOVER BETWEEN MULTIPLE MODES USING A SINGLE WIRELESS RECEIVER

(75) Inventors: Seong-Eun Kim, Plano, TX (US); John A. Interrante, Richardson, TX (US); Lup M. Loh, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 11/511,620

(22) Filed: Aug. 29, 2006

(65) Prior Publication Data

US 2007/0032238 A1 Feb. 8, 2007

Related U.S. Application Data

(63) Continuation-in-part of application No. 11/197,017, filed on Aug. 4, 2005, and a continuation-in-part of application No. 11/326,124, filed on Jan. 5, 2006.

(51) Int. Cl.
*H04Q 7/20* (2006.01)
(52) U.S. Cl. .............. 455/436; 455/439; 455/442; 455/502; 455/324; 455/444; 370/324; 370/331; 370/332; 370/335
(58) Field of Classification Search ............. 455/436, 455/439, 442, 502, 432, 444, 324; 370/324, 370/331, 332, 335
See application file for complete search history.

(56) References Cited

U.S. PATENT DOCUMENTS 6,438,117 B1 * 8/2002 Grilli et al. ............ 370/331
6,965,656 B2 * 11/2005 Koizumi ................ 375/345

\* cited by examiner

*Primary Examiner*—Sanh D Phu (57) ABSTRACT

A method for performing handover between multiple modes for a mobile station is provided. The method includes operating the mobile station in a first mode. A handover from the first mode to a second mode is performed using a single wireless receiver. The mobile station operates in the second mode after performing the handover.

27 Claims, 7 Drawing Sheets

METHOD AND SYSTEM FOR PERFORMING HANDOVER BETWEEN MULTIPLE MODES USING A SINGLE WIRELESS RECEIVER

CROSS-REFERENCE TO RELATED APPLICATIONS AND CLAIM OF PRIORITY

The present application is a continuation-in-part of U.S. patent application Ser. No. 11/197,017, filed Aug. 4, 2005, titled "Wireless Device Minimizing Use of External Bandpass Filter Between Low-Noise Amplifier and First Mixer" and is a continuation-in-part of U.S. patent application Ser. No. 11/326,124, filed Jan. 5, 2006, titled "Versatile System for Multimode, Wireless Communication Receiver with ZIF and Near-ZIF Operations". U.S. patent application Ser. Nos. 11/197,017 and 11/326,124 are assigned to the assignee of the present application and are hereby incorporated by reference into the present application as if fully set forth herein. The present application hereby claims priority under 35 U.S.C. §120 to U.S. patent application Ser. Nos. 11/197,017 and 11/326,124.

TECHNICAL FIELD OF THE INVENTION

The present application relates generally to wireless communications technology and, more specifically, to a method and system for performing handover between multiple modes using a single wireless receiver.

BACKGROUND OF THE INVENTION

In conventional wireless mobile devices, inter-radio access technology (inter-RAT) compressed mode handover from one mode to another mode (such as from Wideband Code Division Multiple Access (WCDMA) to Global System for Mobile Communications (GSM), for example) is accomplished using a separate receiver for each mode. This is due to the inherently uncommon architectures of the receivers. For example, a WCDMA receiver is typically constrained by RF performance to adopt an inter-stage SAW filter, while GSM/Enhanced Data for GSM Evolution (GSM/EDGE) receivers do not have this constraint. However, the use of two receivers for performing the handover operation carries redundancies that result in larger die area and expense. Therefore, there is a need in the art for an improved method of performing a compressed mode handover between multiple modes.

SUMMARY OF THE INVENTION

A method for performing handover between multiple modes for a mobile station is provided. According to an advantageous embodiment of the present disclosure, the method includes operating the mobile station in a first mode. A handover from the first mode to a second mode is performed using a single wireless receiver. The mobile station operates in the second mode after performing the handover.

According to another embodiment of the present disclosure, a mobile station capable of operating in a first mode and a second mode is provided that includes a single wireless receiver. The single wireless receiver is also capable of operating in the first mode and the second mode. The mobile station is operable to perform a handover from the first mode to the second mode using the single wireless receiver.

According to yet another embodiment of the present disclosure, a mobile station capable of operating in a WCDMA mode and a GSM mode is provided that includes a single wireless receiver. The single wireless receiver is also capable of operating in the WCDMA mode and the GSM mode. The mobile station is operable to perform a handover from the WCDMA mode to the GSM mode using the single wireless receiver.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile station.

Figure 1:
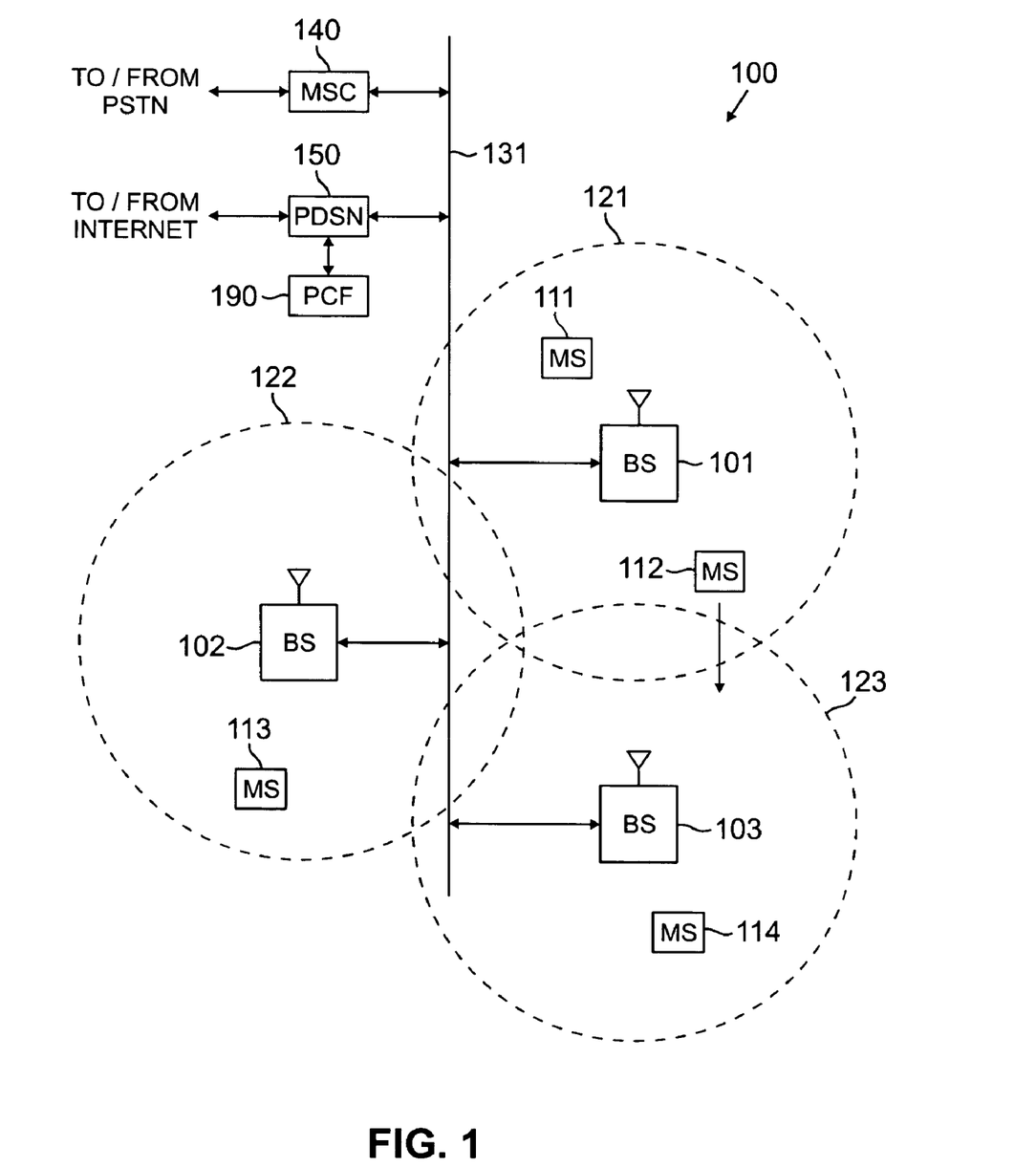
FIG. 1 illustrates a wireless network including mobile stations operable to perform handover between multiple modes using a single wireless receiver according to one embodiment of the disclosure.

FIG. 1 illustrates a wireless network 100 including mobile stations that are each operable to perform handover between multiple modes using a single wireless receiver according to one embodiment of the disclosure. Wireless network 100 comprises a plurality of cells (or cell sites) 121-123, each containing one of the base stations, BS 101, BS 102, or BS 103. In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

As described in more detail below, any one or more of the mobile stations 111-114 may comprise a single multi-mode receiver that is capable of operating in at least two different modes. For example, the multi-mode receiver may be capable of operating in a WCDMA mode and in a GSM/EDGE mode. In addition, the mobile station 111-114 is capable of performing a handover between the modes using the multi-mode receiver with an inter-RAT compressed mode handover process that meets 3GPP requirements. Thus, the compressed mode handover may be performed without the need for multiple receivers, thereby saving die area and cost.

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the radio frequency (RF) transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

Figure 2:
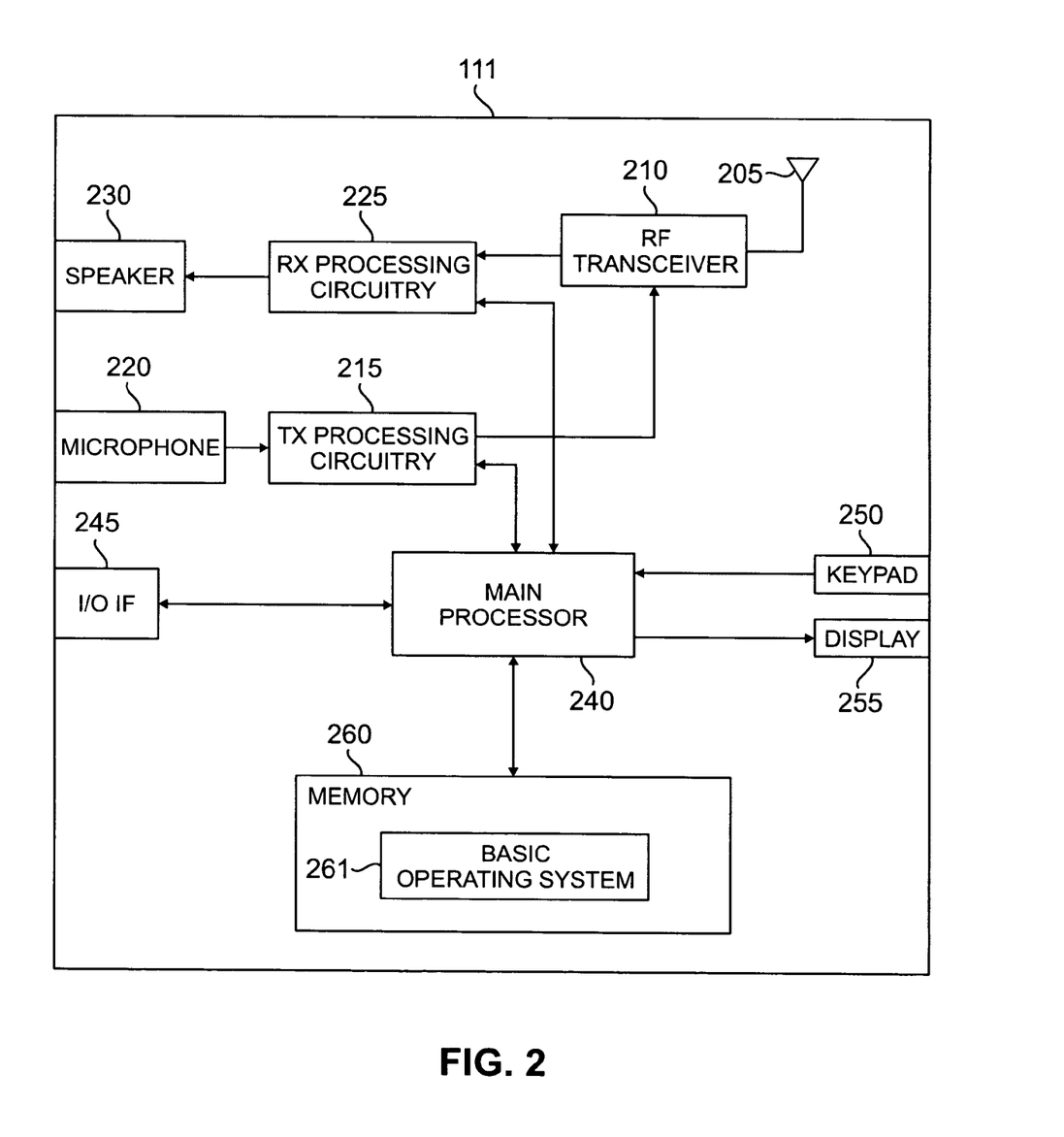
FIG. 2 illustrates a mobile station operable to perform handover between multiple modes using a single wireless receiver according to one embodiment of the disclosure.

FIG. 2 illustrates a mobile station 111 operable to perform handover between multiple modes using a single wireless receiver according to one embodiment of the disclosure. Wireless mobile station 111 comprises antenna 205, radio frequency (RF) transceiver 210, transmit (TX) processing circuitry 215, microphone 220, and receive (RX) processing circuitry 225. MS 111 also comprises speaker 230, main processor 240, input/output (I/O) interface (IF) 245, keypad 250, display 255, and memory 260. Memory 260 further comprises basic operating system (OS) program 261.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225, which produces a processed baseband signal by filtering, digitizing the baseband or IF signal, additional filtering, if necessary, demodulation and/or decoding. Receiver (RX) processing circuitry 225 transmits the processed baseband signal to speaker 230 (i.e., voice data) or to main processor 240 for further processing (e.g., web browsing).

As described in more detail below in connection with FIGS. 3-5, mobile station 111 comprises a single multi-mode receiver that may be implemented in RF transceiver 210 and/or RX processing circuitry 225. The multi-mode receiver is capable of operating in at least two different modes. For example, the multi-mode receiver may be capable of operating in a WCDMA mode and in a GSM/EDGE mode. In addition, as described in more detail below in connection with FIGS. 6 and 7, mobile station 111 is capable of performing a handover between the modes using the multi-mode receiver with an inter-RAT compressed mode handover process that meets 3GPP requirements. This process allows the receiver to switch between WCDMA and GSM/EDGE, for example, using a single synthesizer with an achievable switching time of less than 170 µs.

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, modulates, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In an advantageous embodiment of the present disclosure, main processor 240 is a microprocessor or microcontroller. Memory 260 is coupled to main processor 240. According to an advantageous embodiment of the present disclosure, part of memory 260 comprises a random access memory (RAM) and another part of memory 260 comprises a non-volatile memory, such as Flash memory, which acts as a read-only memory (ROM).

Main processor 240 executes basic operating system (OS) program 261 stored in memory 260 in order to control the overall operation of wireless mobile station 111. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Figure 3:
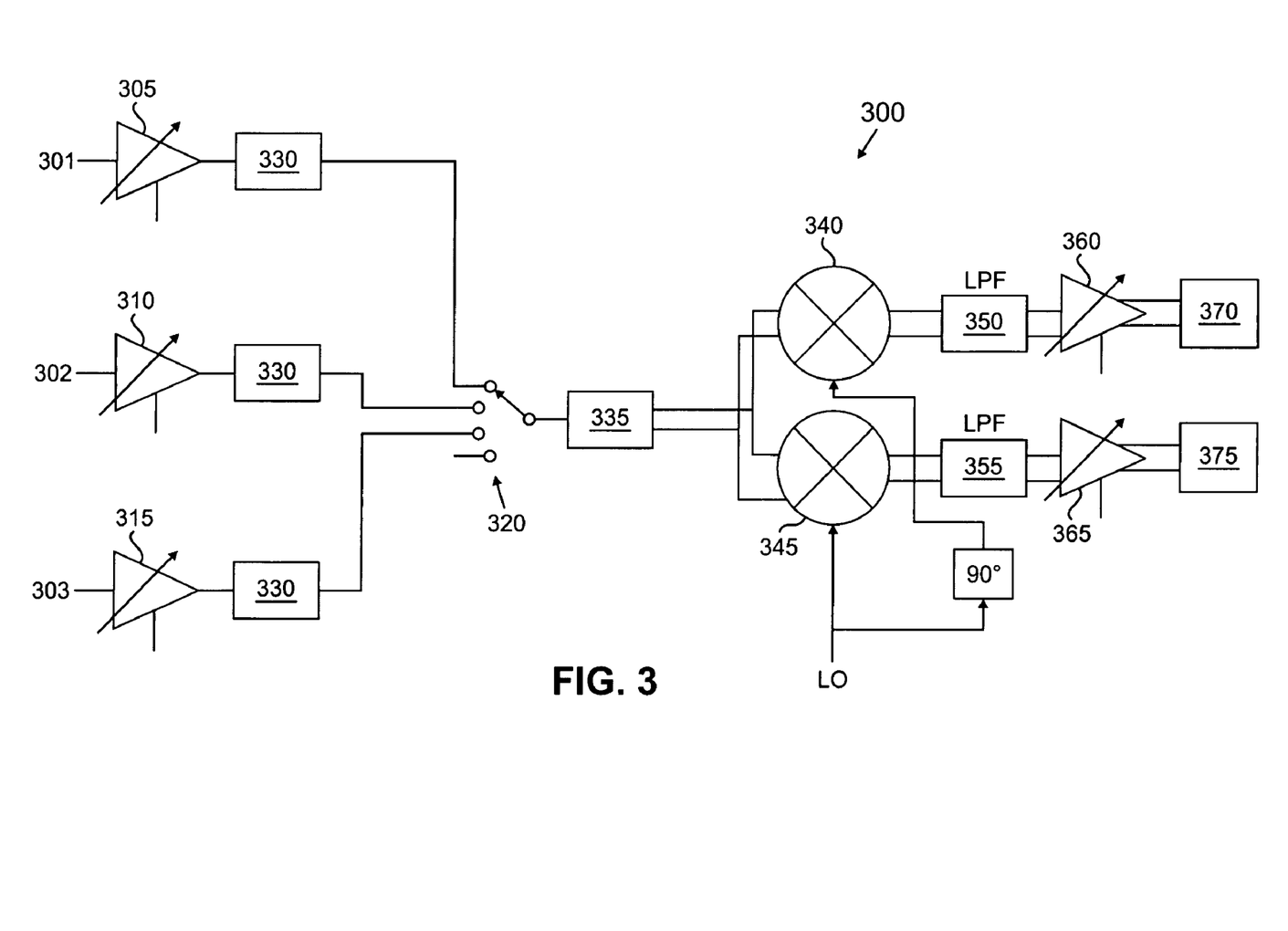
FIG. 3 illustrates details of the receiver of FIG. 2 according to one embodiment of the disclosure.

FIG. 3 illustrates details of a wireless multi-mode receiver 300 according to one embodiment of the disclosure, as described in more detail in U.S. patent application Ser. No. 11/197,017, which has been incorporated by reference. For this embodiment, the receiver 300 may operate as a WCDMA receiver without an external inter-stage RF-SAW filter for each band. The illustrated receiver 300 may be used as part of the implementation of RF transceiver 210 as shown in the mobile station 111 of FIG. 2.

The receiver 300 uses a multi-step (3-step in the illustrated embodiment) gain control for the low noise amplifier (LNA) that allows switching to mid-gain at certain blocker tests but may achieve the maximum gain used to optimize receiver sensitivity. For this embodiment, the receiver 300 comprises three LNAs 305, 310 and 315, an integrated band-pass filter 330, a balun 335, mixers 340 and 345, baseband filters 350 and 355, variable gain amplifiers 360 and 365, and WCDMA ΣΔ ADCs 370 and 375.

However, it will be understood that other embodiments may be implemented. For example, a mixer with multiple transconductance gain amplifiers may interface directly with the multiple LNA differential output loads with certain limited bandpass filtering capabilities to perform the function of switching between them. For this embodiment, the balun function may be undertaken by the LNA cascode differential output stage. Other similar architecture techniques may be implemented, such as the use of more than one mixer in a single receiver chain without an inter-stage filter to afford a common architecture between FDD and TDD receiver systems.

In the design of an ASIC that supports tri-band WCDMA, three LNAs 305, 310 and 315 are used to handle the three bands, shown as inputs 301, 302 and 303. Each of these inputs 301, 302 and 303 is coupled to a corresponding duplexer and/or switch. An integrated switch 320 is illustrated in FIG. 3 to indicate these various options. The LNA load band-pass filtering 330 can be tuned to provide several dB of transmit band rejection after the LNAs 305, 310 and 315. The balun 335 provides matching after the switch 320. Similarly, there are various embodiments of interfaces between the LNAs and mixer that are variants to the switch and balun concept, such as those described in [034], that are applicable to this disclosure.

After analog baseband filtering at baseband filters 350 and 355, the variable gain amplifiers 360 and 365 provide power gain and reduce the dynamic range requirement of the WCDMA ΣΔ ADCs 370 and 375. An optional integrated low-pass filter (not shown in FIG. 3) may be used between the VGA block 360 and 365 and the ΣΔ ADCs 370 and 375, depending on the linearity of the ADCs 370 and 375.

The receiver 300 is able to meet 3GPP TS 25.101 requirements for an FDD WCDMA receiver in Class I through Class VI without an external filter between the LNAs 305, 310 and 315 and the mixers 340 and 345. Instead, the integrated band-pass filters 330 that are implemented between the LNAs 305, 310 and 315 and the mixers 340 and 345 may have much lower selectivity requirements.

Figure 4:
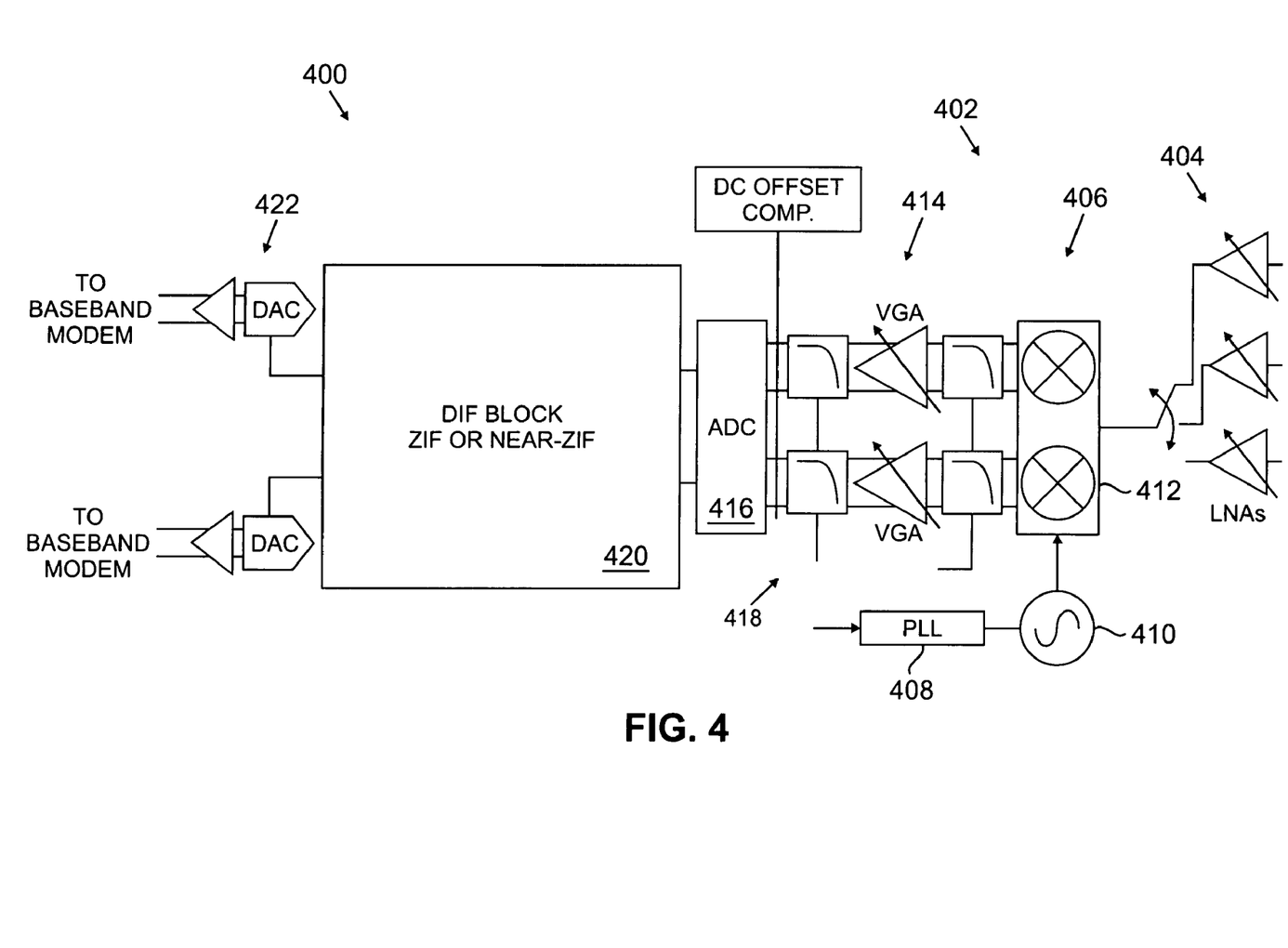
FIG. 4 illustrates details of the receiver of FIG. 2 according to another embodiment of the disclosure.

FIG. 4 illustrates details of a wireless multi-mode receiver 400 according to another embodiment of the disclosure, as described in more detail in U.S. patent application Ser. No. 11/326,124, which has been incorporated by reference. The illustrated receiver 400 may be used as part of the implementation of RF transceiver 210 and/or the RX processing circuitry 225 as shown in the mobile station 111 of FIG. 2.

The receiver 400 comprises a multi-mode architecture that efficiently supports both wideband and narrow band operational modes, especially where such operations are based upon zero intermediate frequency (ZIF) and near-ZIF (NZIF) protocols. For the illustrated embodiment, the multi-mode receiver 400 comprises a reconfigurable digital intermediate frequency (DIF) construct 420. Regardless of whether a ZIF or NZIF based operational mode is active, the DIF construct 420 provides an optimal receiver down conversion for efficient signal processing. Utilizing the DIF construct 420, a single, common-core receiver performs equivalent to multiple, dedicated receivers, with no compromise in signal processing quality.

The receiver 400 may be reconfigured by software to perform either a direct down conversion (e.g., for wide band systems referred to as ZIF) or an NZIF down conversion (e.g., for narrow band systems). For the illustrated embodiment, the multi-mode receiver 400 comprises an analog RF front-end segment 402 that comprises a low noise amplifier segment 404 and a down-conversion segment 406. Down-conversion segment 406 accommodates two or more different down-conversion schemes.

The receiver 400 also comprises a local oscillator (LO) for down-conversion segment 406. The LO may comprise a programmable synthesizer component 408 (e.g., a phase-locked loop (PLL) based device, either fractional or integer based) in conjunction with a widely tunable oscillator element 410. Element 410 then feeds a mixer/demodulation element 412.

The rest of analog segment 402 comprises an analog variable gain amplifier (VGA) block 414 and an analog-to-digital converter (ADC) block 416 to digitize signals being processed. Programmable low-pass filters (LPFs) 418 are implemented at the output portion of both the down converter block 406 and VGA block 414 to provide blocking and anti-aliasing functions. From these segments, signals pass to the DIF construct 420, which processes those signals in the digital domain, as described below in connection with FIG. 5, before outputting the signals to a baseband modem (not shown) via digital-to-analog converter (DAC) elements 422.

Figure 5:
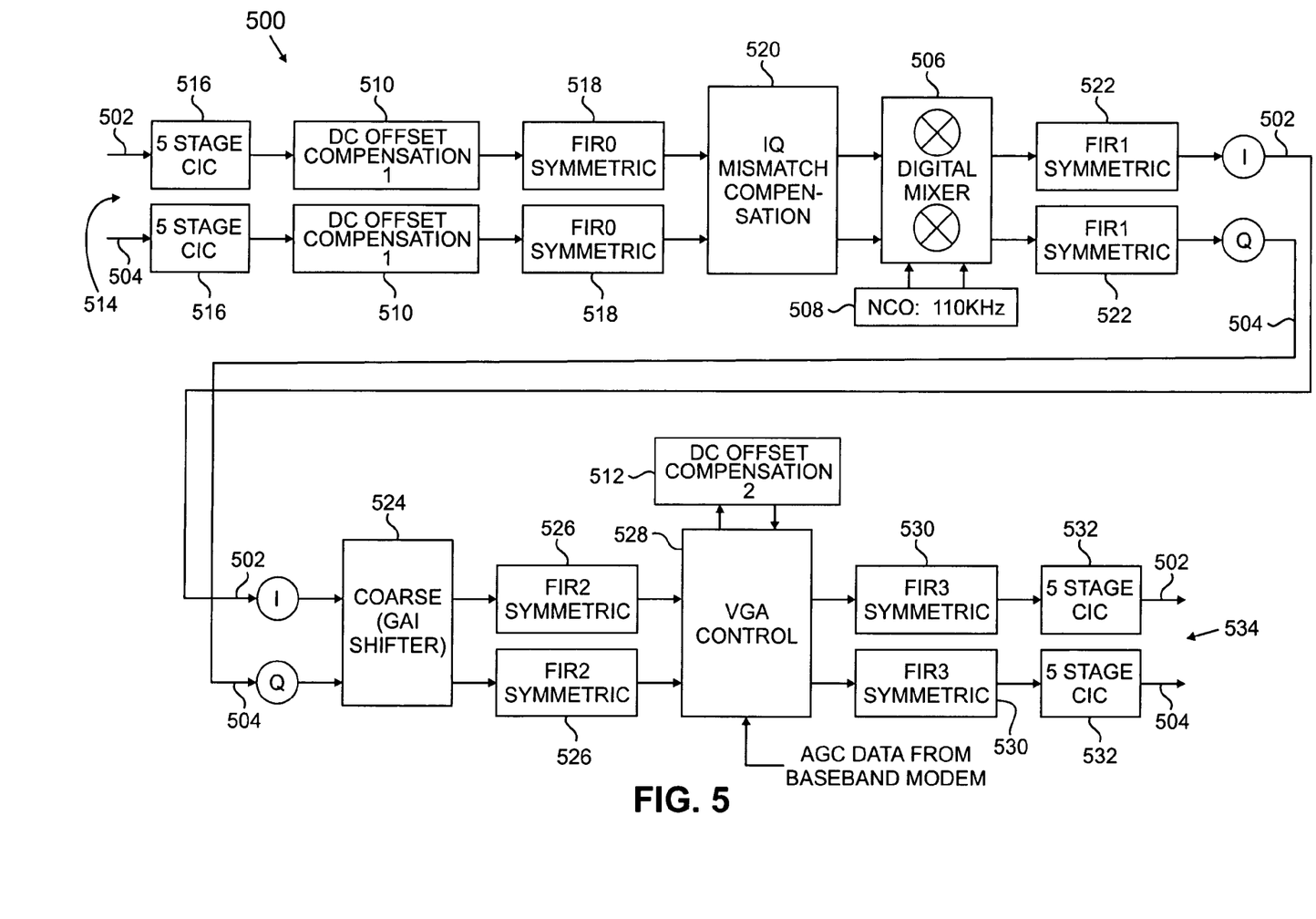
FIG. 5 illustrates a multi-mode signal processing segment for use in the receiver of FIG. 4 according to one embodiment of the disclosure.

FIG. 5 illustrates a DIF construct 500 for use in the wireless receiver 400 according to one embodiment of the disclosure, as described in more detail in U.S. patent application Ser. No. 11/326,124, which has been incorporated by reference. Thus, the DIF construct 500 comprises one implementation of the DIF construct 420 of FIG. 4.

For a particular embodiment, construct 500 may be provided for multi-mode utilization with WCDMA ZIF and GSM/EDGE NZIF based systems. Construct 500 may be provided using a wide array of variations and combinations that are easily adapted to a number of multi-mode, ZIF/NZIF applications. The relative arrangement and orientations of certain filtering or compensation elements may be provided in any manner suitable for a particular application.

Construct 500 may be provided such that it uses the same data bus and width for both ZIF and NZIF modes. Depending upon the communication and processing technologies of a given application, construct 500 may comprise separate but parallel paths for processing different signal components. For example, in the illustrated embodiment, construct 500 comprises signal processing paths 502 and 504 for parallel processing of quadrature components (I) and (Q), respectively.

Construct 500 further comprises an IF to baseband digital mixer element 506 that is utilized for NZIF operation, as driven by a numerically controlled oscillator (NCO) 508, and that is bypassed or disabled for ZIF operation. Mixer 506 provides complex down-conversion for image filtering when operating at NZIF frequency. A DC offset correction element 510 is also provided. DC offset correction 510 is utilized in NZIF operation but may not be needed at an IF frequency of 170 kHz or above. ZIF operation will utilize a DC residual correction element 512 that is provided at some point after processing by FIR filters 518, 522 and 526.

As signals are introduced to construct 500 via inputs 514, a signal may be processed by a first filtering element 516 prior to any offset compensation performed by element 510. For one embodiment, filtering element 516 comprises a 5-stage cascaded integrator-comb (CIC) type of filter and has a programmable decimation rate (M) that may be provided or determined based on the incoming ADC rate.

From element 516, signal proceeds through offset compensation 510, and may then be filtered again by second filtering element 518 before proceeding to a mismatch compensation element 520. For the illustrated embodiment, element 518 comprises a symmetric finite impulse response (FIR) type filter, providing droop compensation of prior analog LPFs 418 or CIC filter 516. After compensation by element 518, signal proceeds through mismatch compensation 520 to mixer element 506. After processing by element 506, signal may then proceed through a channel filtering element 522 before processing by a gain adjust element 524. For one embodiment, element 522 comprises a symmetric FIR type filter.

Element 524 provides a coarse gain adjustment (i.e., switchable step gain) from which signal may then proceed through another channel filtering element 526, before proceeding to variable gain amplification (VGA) element 528. For one embodiment, element 526 also comprises a symmetric FIR type filter. Once signal has been processed through VGA element 528, it may then proceed through one or more forms of interpolation filter elements 530, 532, before being output 534 from construct 500. For one embodiment, element 530 comprises a symmetric FIR type interpolation filter, while element 532 comprises a 5-stage CIC interpolation component. Element 532 has a programmable interpolation rate (N) that may be determined or provided based upon the rate of a DAC to which signals are output 534.

VGA element 528 may be provided to maintain some nominal signal level into a baseband modem from output 534. Digital channel filtering elements 522 and 526 may be provided in a programmable format, enabling those elements 522 and 526 to be reconfigurable or optimizable for signals in different modes with various bandwidths.

A common receiver architecture for WEDGE may be achieved using the receiver 300 of FIG. 3, which removes the need for an inter-stage SAW filter for WCDMA. Additionally, the common receiver may perform optimally in both GSM/EDGE and WCDMA by using a reconfigurable radio, such as that described in connection with FIGS. 4 and 5. Thus, using these components 300, 400 and 500, the timing requirements for performing a handover with WEDGE compressed mode using a single receiver may be met, as described in more detail below in connection with FIGS. 6 and 7.

Implementing the type of receiver architecture described in connection with FIG. 3 or FIGS. 4-5 allows the analog receiver to switch between WCDMA and GSM/EDGE using a single synthesizer with an achievable switching time of less than 170 µs. The efficiency of operation may be enhanced by using a reconfigurable synthesizer that may program the loop filters to minimize switching time during transition, while optimizing phase noise during steady state. Additionally, the synthesizer may switch to a lower power mode when operating in a less stringent mode of operation.

For another embodiment, inter-RAT compressed mode handover may be provided between high-speed downlink packet access (HSDPA) in diversity operation and GSM/EDGE when an additional diversity receiver chain is in use. Furthermore, other suitable FDD and TDD systems that may share a similar common receiver architecture may also provide for single-receiver handover.

Figure 6:
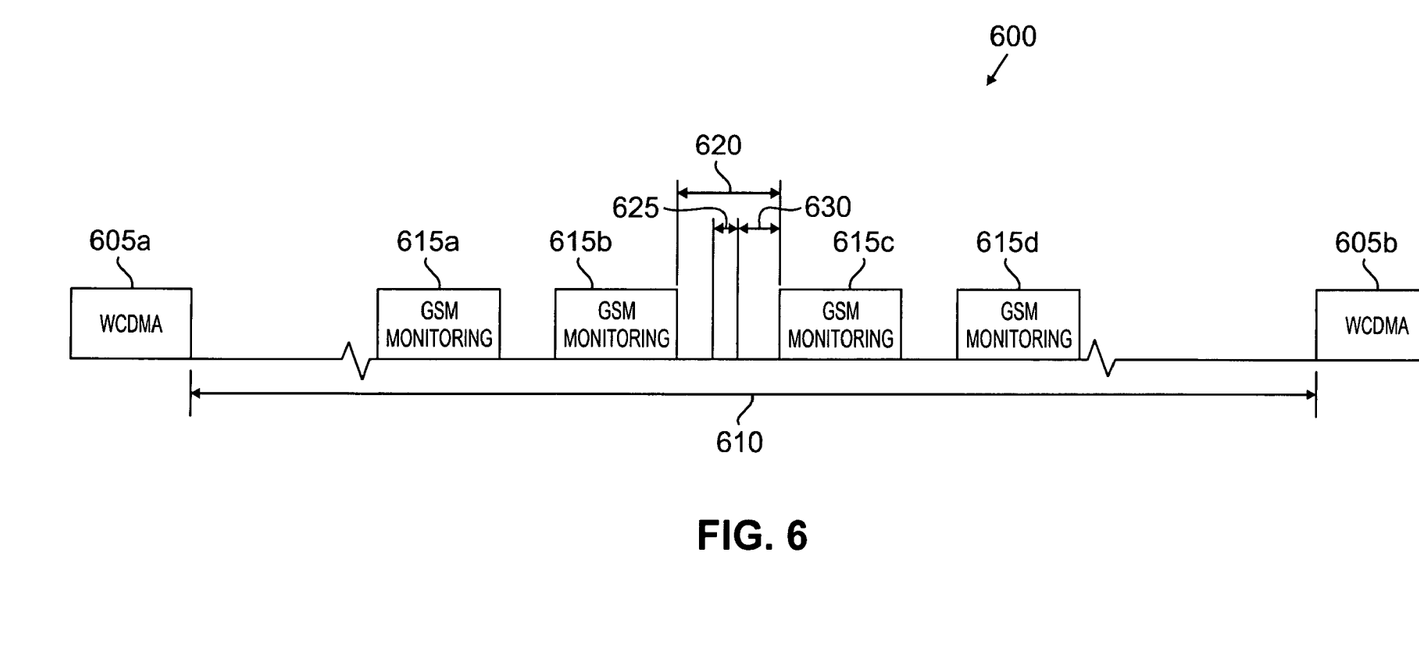
FIG. 6 illustrates a timing diagram for performing compressed mode operation and for switching the receiver of FIG. 2 between multiple modes according to one embodiment of the disclosure.

FIG. 6 illustrates a timing diagram 600 for performing compressed mode operation and for switching a multi-mode receiver between multiple modes according to one embodiment of the disclosure. The receiver may comprise RF transceiver 210 and/or RX processing circuitry 225, the wireless receiver 300, the wireless receiver 400 or other suitable multi-mode receiver. For the embodiment of FIG. 6, the timing diagram 600 illustrates that inter-RAT compressed mode handover between WCDMA and GSM, as defined in WCDMA standard TS 25.133, that meets 3GPP requirements may be provided using a single multi-mode receiver.

The timing diagram 600 illustrates a plurality of WCDMA time slots 605a-b. In compressed mode, for one embodiment, WCDMA provides for a transmission gap 610 with a length that is equivalent to fourteen WCDMA slots. Thus, for this embodiment, each WCDMA slot 605 may comprise 666.67 µs and the transmission gap 610 may comprise 9.33 ms. However, it will be understood that the transmission gap 610 may comprise any suitable number of WCDMA slots.

While the mobile station is operating in compressed mode during the transmission gap 610, the multi-mode receiver switches from the WCDMA mode to the GSM mode in order to allow the mobile station to monitor GSM base stations for possible handover. Thus, within the transmission gap 610, a plurality of GSM monitoring segments 615 may be provided. For one embodiment, each GSM monitoring segment 615 comprises 236.3 µs and the transmission gap 610 of fourteen WCDMA slots comprises fifteen GSM monitoring segments 615. Thus, although the timing diagram 600 shows only four GSM monitoring segments 615a-d, it will be understood that this is for illustrative purposes only.

Each GSM monitoring segment 615 provides time for the mobile station to monitor the signal strength of any nearby GSM base stations, while the mobile station is still operating in conjunction with a WCDMA base station. If the mobile station detects a signal strength greater than a predetermined threshold during the GSM monitoring segment 615, a handover may be initiated.

Between any two consecutive GSM monitoring segments 615, such as 615b and 615c, a set-up gap 620 provides time for the receiver to set-up for an active burst in which a signal is received (during the next GSM monitoring segment 615). For a particular embodiment, the set-up gap 620 comprises 332.4 µs. Within the set-up gap 620, a relatively long group delay 625 may be provided. For example, the group delay 625 may comprise up to 35 µs. The group delay 625 is the total propagation delay of a signal through the receiver chain in the multi-mode receiver.

Finally, also within the set-up gap 620, a synthesizer switching segment 630 is provided. The synthesizer switching segment 630 may comprise 170 µs. The synthesizer switching segment 630 is the maximum time allotted for switching the synthesizer from one channel to another. Thus, with 170 µs, the set-up gap 620 provides more than enough time to switch between monitoring frequency bands/channels.

For the illustrated embodiment, a handover is not actually performed, as indicated by the WCDMA time slot 605b following the end of the transmission gap 610. Instead, after the mobile station exits the compressed mode at the end of the transmission gap 610, the multi-mode receiver switches back to the WCDMA mode. However, it will be understood that, if the signal strength for a GSM base station surpasses the predetermined threshold and that GSM base station is identified and confirmed by the mobile station, the mobile station is capable of performing a handover from the WCDMA mode to the GSM mode using the multi-mode receiver within the allotted time, as described above.

Figure 7:
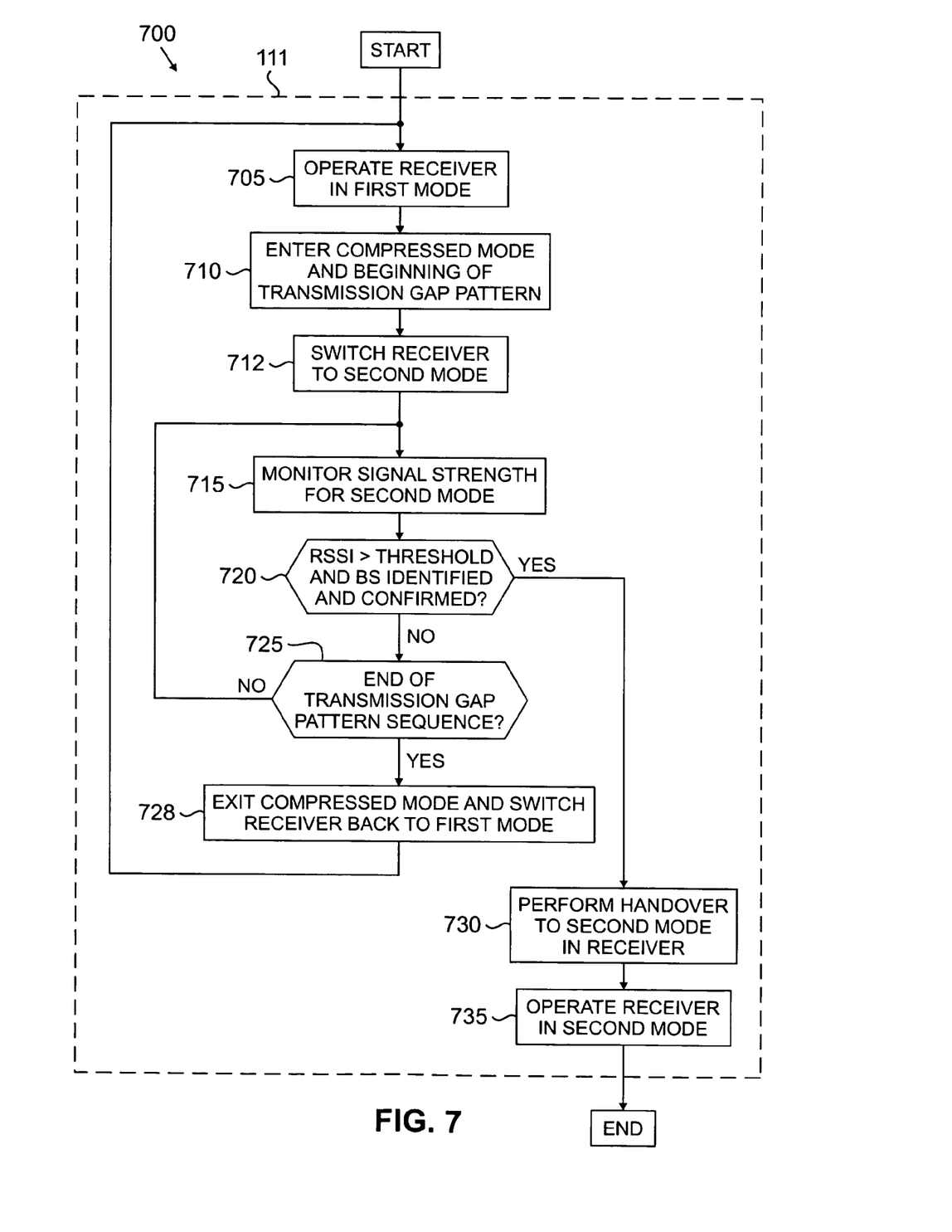
FIG. 7 is a flow diagram illustrating a method for performing handover between multiple modes using the receiver of FIG. 2 according to one embodiment of the disclosure.

FIG. 7 is a flow diagram illustrating a method 700 for performing handover between multiple modes using a single multi-mode receiver, such as RF transceiver 210 and/or RX processing circuitry 225, the wireless receiver 300 or the wireless receiver 400, in the mobile station 111 according to one embodiment of the disclosure.

Initially, the mobile station 111 operates in a first mode using the multi-mode receiver, which is also operating in the first mode (process step 705). For example, the mobile station 111 and receiver may operate in a WCDMA mode. The mobile station 111 then enters an inter-RAT compressed mode and, thus, the beginning of a transmission gap pattern, which comprises a plurality of transmission gaps 610 (process step 710). While operating in the compressed mode, the receiver switches from the first mode to a second mode (process step 712). For example, the receiver may switch from the WCDMA mode to a GSM mode.

During a monitoring segment 615, the mobile station 111 monitors a signal strength for one or more base stations operating in the second mode (process step 715). For example, the mobile station 111 may monitor signal strength for GSM base stations during a GSM monitoring segment 615.

The mobile station 111 then determines whether or not the signal strength for any detected base station operating in the second mode has surpassed a predetermined threshold (process step 720). If the signal strength for none of the detected base stations operating in the second mode has surpassed the predetermined threshold (process step 720), a determination is made regarding whether the end of the transmission gap pattern sequence has been reached (process step 725).

If the end of the transmission gap pattern sequence has not been reached (process step 725), the method returns to step 715, where the mobile station 111 monitors a signal strength for one or more base stations operating in the second mode during a subsequent monitoring segment 615, such as GSM monitoring segment 615. However, if the end of the transmission gap pattern sequence has been reached (process step 725), the mobile station 111 exits the compressed mode and the receiver switches back from the second mode to the first mode (process step 728). The method then returns to step 705, where the mobile station 111 and receiver continue to operate in the first mode.

Returning to decisional step 720, if the signal strength for one of the detected base stations operating in the second mode has surpassed the predetermined threshold and the corresponding base station has been positively identified and confirmed (process step 720), the mobile station 111 performs a handover to the second mode using the receiver (process step 730). For example, the mobile station 111 may perform a handover from the WCDMA mode to the GSM mode. The mobile station 111 and receiver then operate in the second mode, such as the GSM mode (process step 735), and the method comes to an end.

In this way, mobile station 111 may perform a compressed mode handover from a first mode, such as WCDMA, to a second mode, such as GSM, using a single multi-mode receiver. This results in a substantial reduction in die area and cost as compared to multi-mode mobile stations that use multiple receivers for performing handovers between multiple modes.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing handover between multiple modes for a mobile station, comprising:
    operating the mobile station in a first mode, the mobile station including a plurality of selectable low-noise amplifiers each corresponding to a radio-frequency band of the first mode, wherein the selectable low-noise amplifier are selected through a switch;
    performing a handover from the first mode to a second mode using a single wireless receiver; and
    operating the mobile station in the second mode after performing the handover wherein the mobile station further comprises a balun element for matching after at least one signal passes through the switch.

2. The method as set forth in claim 1, further comprising entering a compressed mode and the beginning of a transmission gap pattern.

3. The method as set forth in claim 2, further comprising switching the receiver from the first mode to the second mode while operating in the compressed mode.

4. The method as set forth in claim 3, further comprising, for each of a plurality of monitoring segments, monitoring a signal strength for at least one base station operating in the second mode.

5. The method as set forth in claim 4, performing the handover comprising performing the handover when the signal strength for the base station has surpassed a predetermined threshold and the base station is identified and confirmed.

6. The method as set forth in claim 4, further comprising, when the signal strength for the base station fails to surpass a predetermined threshold, exiting the compressed mode and switching the receiver back from the second mode to the first mode.

7. The method as set forth in claim 2, the first mode comprising a Wideband Code Division Multiple Access (WCDMA) mode and the transmission gap pattern comprising a plurality of transmission gaps, each transmission gap comprising fourteen time slots.

8. The method as set forth in claim 1, the first mode comprising one of a WCDMA mode and a high-speed downlink packet access (HSDPA) mode and the second mode comprising a Global System for Mobile Communications (GSM) mode.

9. The method as set forth in claim 1, performing the handover comprising performing an inter-radio access technology (inter-RAT) compressed mode handover.

10. A mobile station operable to operate in a first mode and a second mode, comprising a single wireless receiver operable to operate in the first mode and the second mode and a plurality of selectable low-noise amplifiers each corresponding to a radio-frequency band of the first mode, the mobile station operable to perform a handover from the first mode to the second mode using the single wireless receiver using a switch to select the low-noise amplifier, wherein the mobile station further comprises a balun element for matching after at least one signal passes through the switch.

11. The mobile station as set forth in claim 10, the mobile station further operable to enter a compressed mode and the beginning of a transmission gap pattern.

12. The mobile station as set forth in claim 11, the receiver further operable to switch from the first mode to the second mode while the mobile station is in the compressed mode.

13. The mobile station as set forth in claim 12, the mobile station further operable, for each of a plurality of monitoring segments, to monitor a signal strength for at least one base station operating in the second mode.

14. The mobile station as set forth in claim 13, the mobile station operable to perform the handover when the signal strength for the base station has surpassed a predetermined threshold and the base station is identified and confirmed.

15. The mobile station as set forth in claim 13, the mobile station operable to exit the compressed mode and the receiver operable to switch back from the second mode to the first mode when the signal strength for the base station fails to surpass a predetermined threshold.

16. The mobile station as set forth in claim 10, the first mode comprising one of a WCDMA mode and an HSDPA mode and the second mode comprising a GSM mode.

17. The mobile station as set forth in claim 10, the mobile station operable to perform the handover by performing an inter-RAT compressed mode handover.

18. A mobile Station operable to operate in a WCDMA mode and a GSM mode, comprising a single wireless receiver operable to operate in the WCDMA mode and the GSM mode and a plurality of selectable low-noise amplifiers that are selected using a switch each corresponding to a radio-frequency band of the WCDMA mode, the mobile station operable to perform a handover from the WCDMA mode to the GSM mode using the single wireless receiver, wherein the mobile station further comprises a balun element for matching after at least one signal passes through the switch.

19. The mobile station as set forth in claim 18, the mobile station further operable to enter a compressed mode and the beginning of a transmission gap pattern.

20. The mobile station as set forth in claim 19, the receiver further operable to switch from the WCDMA mode to the GSM mode while the mobile station is in the compressed mode.

21. The mobile station as set forth in claim 20, the transmission gap pattern comprising a plurality of transmission gaps, each transmission gap comprising fourteen WCDMA time slots.

22. The mobile station as set forth in claim 21, the mobile station further operable, for each of fifteen GSM monitoring segments, to monitor a signal strength for at least one base station operating in the GSM mode.

23. The mobile Station as set forth in claim 22, the mobile station operable to perform the handover when the signal strength for the base station has surpassed a predetermined threshold and the base station is identified and confirmed.

24. The mobile station as set forth in claim 22, the mobile station operable to exit the compressed mode and the receiver operable to switch back from the GSM mode to the WCDMA mode when the signal strength for the base station fails to surpass a predetermined threshold.

25. The mobile station as set forth in claim 22, each of the transmission gaps comprising about 9.33 milliseconds, each of the GSM monitoring segments comprising about 236.3 microseconds.

26. The mobile station as set forth in claim 25, each of the transmission gaps comprising a synthesizer switching segment, the synthesizer switching segment comprising about 170 microseconds.

27. The mobile station as set forth in claim 18, the mobile station operable to perform the handover by performing an inter-RAT compressed mode handover.

* * * * *